No. 641,273. Patented Jan. 16, 1900.
J. D. COON.
COOKING UTENSIL.
(Application filed June 3, 1899.)
(No Model.)
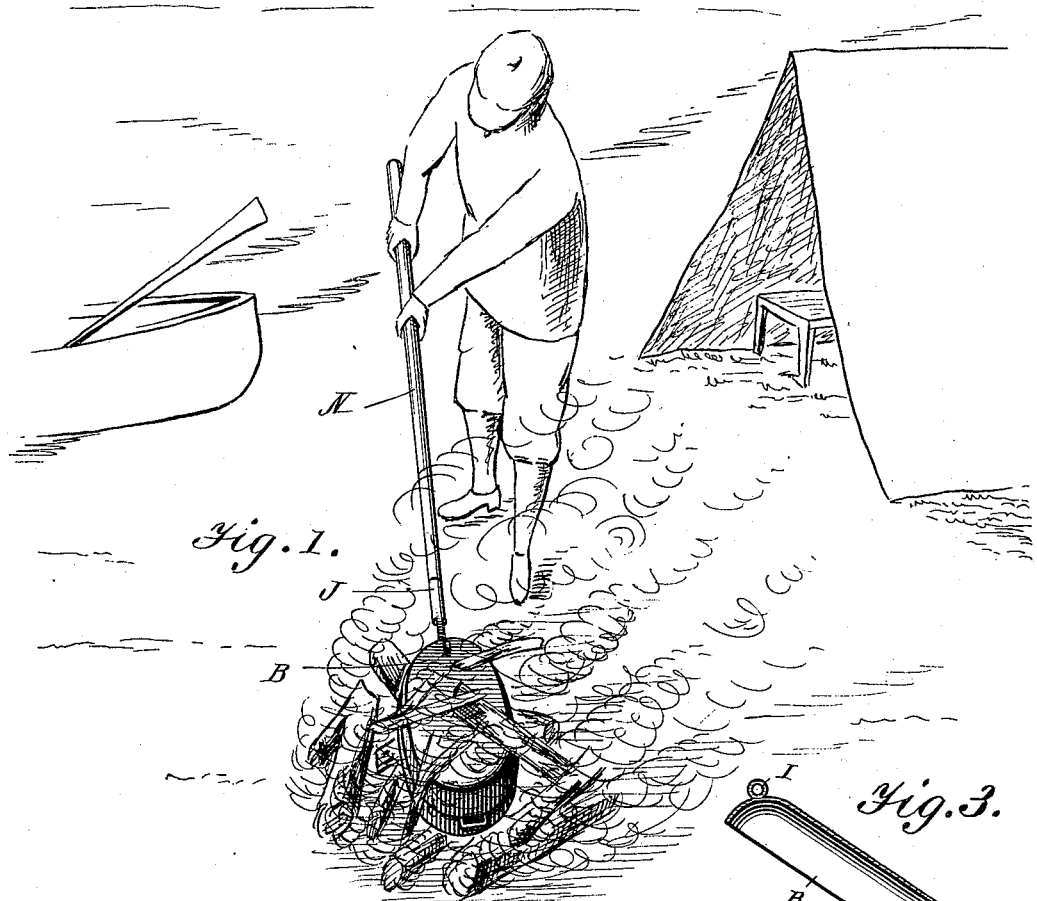
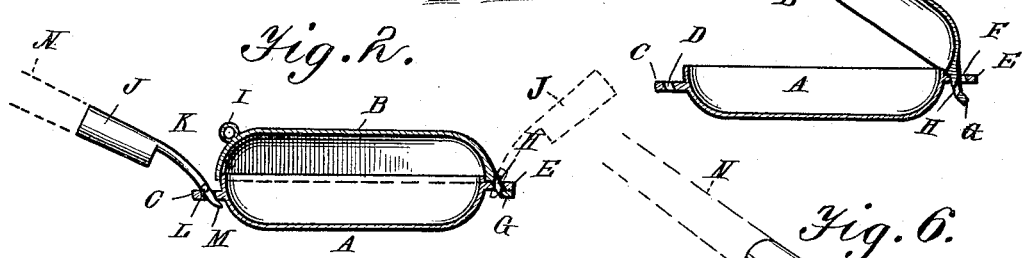
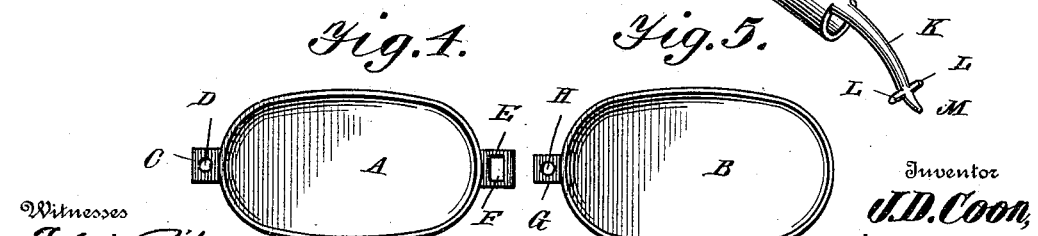
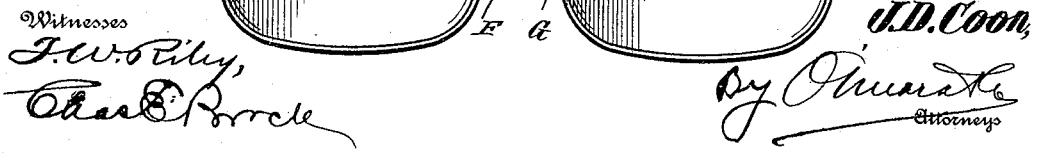
Witnesses
Inventor
J. D. Coon,
Attorneys

UNITED STATES PATENT OFFICE.

JOHN DENNIS COON, OF NATHROP, COLORADO.

COOKING UTENSIL.

SPECIFICATION forming part of Letters Patent No. 641,273, dated January 16, 1900.

Application filed June 3, 1899. Serial No. 719,290. (No model.)

*To all whom it may concern:*

Be it known that I, JOHN DENNIS COON, a citizen of the United States, residing at Nathrop, in the county of Chaffee and State of Colorado, have invented a certain new and useful Cooking Utensil, of which the following is a specification.

My invention is in the nature of a cooking utensil especially intended for the use of campers or others using an open fire, but also capable of use on or in a stove when desired, one object of the invention being to provide a cooking utensil of this class of improved form, whereby it may be used as two separate frying-pans or as a single covered utensil protected against the admission of ashes or dirt when used in a camp-fire and against the emission of grease upon the stove or surroundings when used in the house in either situation, all the aroma and strength of the food being retained and the contents baked, boiled, broiled, stewed, or otherwise cooked, the utensil being capable of being turned over to facilitate its operation.

A further object of my invention is to provide such a utensil with improved interlocking means by which the two pans are secured together, said interlocking means also serving as means for attaching a handle removably thereto—a very important provision in a cooking utensil used by campers, for the reason that the usual rigidly-secured long handles of campers must be held or propped up to prevent them tipping the pans and wasting the contents.

With these objects in view my invention consists in the improved construction, arrangement, and combination of parts hereinafter fully described and afterward specifically pointed out in the claims hereto appended.

In order to enable others skilled in the art to which my invention most nearly appertains to make and use the same, I will now proceed to describe its construction and operation, reference being had to the accompanying drawings, in which—

Figure 1 is a view illustrating a cooking utensil constructed in accordance with my invention in practical use in a camp-fire. Fig. 2 is a longitudinal vertical section through the utensil complete, the handle being shown partly in elevation and partly in dotted lines. Fig. 3 is a sectional view on the same plane with the upper pan or cover raised and the handle omitted. Fig. 4 is a top plan view of the lower pan or pan proper. Fig. 5 is a similar view of the upper pan or cover when in position for use as a separate pan. Fig. 6 is a detail perspective view of the handle, the wooden portion thereof being partly shown in dotted lines.

Like letters of reference mark the same parts whenever they occur in the various figures of the drawings.

Referring to the drawings by letters, A and B indicate two frying-pans of any desirable shape, shown as oblong and approaching an elliptical shape. The pan A is provided with a horizontal ear or lug C on one end, having a round hole or passage D inclined downwardly toward the pan, and a horizontal ear or lug E on the opposite end, having an oblong rectangular hole or opening F inclined downwardly away from the pan. The pan B is provided with an ear or lug G at one end, extending upwardly from the edge of the pan and inclined outwardly and having a hole or opening H inclined in the opposite direction and with a ring or eye I for lifting purposes.

J indicates the ferrule of the handle, provided with an extension or finger K, having laterally-projecting arms L near the point M. A long or short wooden handle N may be secured in the ferrule J, as may be desired, as indicated, as shown in full lines in Fig. 1 and in dotted lines in Figs. 2 and 6.

In operation the two pans A and B may be used as two frying-pans, as in Figs. 4 and 5, or the pan B, which is slightly larger than pan A, may be used as a cover therefor, as in Figs. 1, 2, and 3, so that it will overlap pan A for about three-quarters of an inch when closed down upon it. To adjust pan B as a cover, the lug G is passed through the hole F in lug E of pan A, thus forming a hinge and catch upon which the cover may be raised, as in Fig. 3, to inspect the contents, the eye I facilitating such raising. When desired, the point M of the handle may be inserted in opening D in lug C of pan A or in opening H of lug G of cover-pan B, in the latter instance passing also through opening F of lug E. The projections L prevent the handle from being thrust too far through the openings in the lugs. When thus assembled, the two pans form a closed utensil, which may be placed in a camp-fire of wood, chips, or brush and may be entirely covered in coals or ashes, forming an admirable roaster, baker, or boiler, being fully protected from dirt, dust, or ashes by the overhang of cover-pan B. This form may also be used on a stove or in an oven, the cover retaining all the juices, essence, aroma, and strength of the meat or other food being cooked, preventing grease or liquid from sputtering out upon the stove or surrounding floor or furniture.

The advantages of my invention are numerous and need scarcely be herein detailed. The whole kit may be closely packed, affords utensils for cooking any and all kinds of food thoroughly, and is cheap, handy, and reliable for its purposes.

Having thus fully described my invention, what I claim as new, and desire to secure by Letters Patent of the United States, is—

1. The herein-described cooking utensil, comprising the pan A provided with horizontal ear or lug C having a downwardly and inwardly inclined opening D and a horizontal ear E with downwardly and outwardly inclined opening F, and the cover-pan B, provided with outwardly-inclined lug G having opening H inwardly inclined, the opening F being adapted to receive lug G and form a hinge and the opening D, being adapted to receive a handle, substantially as described.

2. The herein-described cooking utensil, comprising a pan proper provided at one end with a horizontal ear or lug having a downwardly and inwardly inclined opening, and at its opposite end with a horizontal ear or lug having a downwardly and outwardly inclined opening and a cover-pan provided at one end with an outwardly-inclined lug or ear projecting from its edge adapted to engage in the downwardly and outwardly inclined opening within the ear in the lug of the pan proper to form a hinge and at its opposite end with an eye to facilitate lifting, the cover-pan being slightly larger than the pan proper, whereby it will overlap its edge when in position, the opening in the lugs at either end of the complete utensil being adapted to receive a removable handle, substantially as described.

JOHN DENNIS COON.

Witnesses:
  H. BUTLER,
  CHAS. LOGAN.